(12) United States Patent
Petillon (10) Patent No.: US 10,935,672 B2
(45) Date of Patent: Mar. 2, 2021

(54) REDUNDANT DEVICE OF PILOTING SENSORS FOR A ROTARY-WING AIRCRAFT

(71) Applicant: AIRBUS HELICOPTERS, Marignane (FR)

(72) Inventor: Jean Paul Petillon, Miramas (FR)

(73) Assignee: Airbus Helicopters, Marignane (FR)

(*) Notice: Subject to any disclaimer, the term of this patent is extended or adjusted under 35 U.S.C. 154(b) by 398 days.

(21) Appl. No.: 15/534,053

(22) PCT Filed: Dec. 9, 2015

(86) PCT No.: PCT/FR2015/000223
§ 371 (c)(1),
(2) Date: Jun. 8, 2017

(87) PCT Pub. No.: WO2016/092160
PCT Pub. Date: Jun. 16, 2016

(65) Prior Publication Data
US 2017/0336517 A1    Nov. 23, 2017

(30) Foreign Application Priority Data
Dec. 11, 2014   (FR) ...................................... 1402824

(51) Int. Cl.
*G01S 19/52* (2010.01)
*G01S 19/20* (2010.01)
(Continued)

(52) U.S. Cl.
CPC .............. *G01S 19/52* (2013.01); *G01S 19/20* (2013.01); *G01S 19/423* (2013.01); *G01S 19/49* (2013.01); *G01S 19/23* (2013.01); *G01S 19/26* (2013.01)

(58) Field of Classification Search
CPC .......... G01S 19/52; G01S 19/20; G01S 19/23; G01S 19/26; G01S 19/423; G01S 19/49; G01S 19/47
(Continued)

(56) References Cited

U.S. PATENT DOCUMENTS 4,264,955 A    4/1981 Goodwin
5,583,774 A   12/1996 Diesel
(Continued)

FOREIGN PATENT DOCUMENTS

CN    1135265 A    11/1996
CN    1439891 A     9/2003
(Continued)

OTHER PUBLICATIONS

Russian Search Report for Application No. RU2017116970/07, dated Apr. 6, 2018, 2 pages.
(Continued)

*Primary Examiner* — Chuong P Nguyen
(74) *Attorney, Agent, or Firm* — Brooks Kushman P.C.

(57) ABSTRACT

A device of piloting sensors for a rotary wing aircraft having at least two IMU inertial modules, at least two GNSS receivers having respective first fault detection and exclusion modules for detecting and excluding failures and covering distinct GNSS satellite navigation systems, at least two second FDE modules, at least two hybridizing platforms, and at least one third FDE module. The FDE modules enable signals that are of integrity and/or signals that are erroneous to be detected so as to exclude each GNSS system that is defective. In addition, each hybridizing platform makes it possible to determine a hybridized ground speed in order to delivering a ground speed for said aircraft that is accurate and of integrity.

21 Claims, 3 Drawing Sheets

(51) Int. Cl.
*G01S 19/42* (2010.01)
*G01S 19/49* (2010.01)
*G01S 19/23* (2010.01)
*G01S 19/26* (2010.01)

(58) Field of Classification Search
USPC .......... 342/357.35, 357.58, 357.62, 357.65, 342/357.28, 357.3, 357.32
See application file for complete search history.

(56) References Cited

U.S. PATENT DOCUMENTS

| | | | |
|---|---|---|---|
| 5,619,211 A * | 4/1997 | Horkin | H04B 7/18508 342/352 |
| 5,787,384 A | 7/1998 | Johnson | |
| 5,969,674 A * | 10/1999 | von der Embse | G01S 13/003 342/357.2 |
| 6,246,363 B1 * | 6/2001 | Yung | G01S 5/14 342/357.29 |
| 6,408,245 B1 | 6/2002 | An et al. | |
| 6,639,549 B2 * | 10/2003 | Vanderwerf | G01S 19/20 342/357.58 |
| 6,785,553 B2 * | 8/2004 | Chang | G01S 5/14 342/357.48 |
| 6,944,541 B2 * | 9/2005 | Pasturel | G01S 19/15 342/357.29 |
| 7,409,289 B2 | 8/2008 | Coatantiec et al. | |
| 7,436,354 B2 * | 10/2008 | Lee | G01S 19/46 342/357.29 |
| 7,711,482 B2 | 5/2010 | Coatantiec et al. | |
| 7,805,245 B2 | 9/2010 | Bacon et al. | |
| 7,940,210 B2 * | 5/2011 | Fly | G01S 19/23 342/357.24 |
| 8,179,309 B2 * | 5/2012 | Trautenberg | G01S 19/08 342/357.395 |
| 8,229,606 B2 | 7/2012 | Vos et al. | |
| 8,355,867 B2 | 1/2013 | Vacher et al. | |
| 8,447,520 B2 | 5/2013 | Gine I Cortiella et al. | |
| 8,878,722 B2 | 11/2014 | Revol et al. | |
| 8,976,064 B2 * | 3/2015 | Brenner | G01S 19/07 342/357.58 |
| 9,146,322 B2 | 9/2015 | Coatantiec | |
| 9,151,620 B2 | 10/2015 | Arethens et al. | |
| 9,291,714 B2 | 3/2016 | Vourc'h | |
| 9,488,734 B2 | 11/2016 | Davain | |
| 9,784,844 B2 * | 10/2017 | Kana | G01S 19/20 |
| 10,066,944 B1 * | 9/2018 | McNamara | G01C 21/165 |
| 10,209,076 B1 * | 2/2019 | McNamara | G01C 21/165 |
| 10,514,260 B2 * | 12/2019 | Roberfroid | G01C 21/165 |
| 2003/0163256 A1 | 8/2003 | Edwards et al. | |
| 2008/0062041 A1 | 3/2008 | Lee | |
| 2009/0122295 A1 | 5/2009 | Eaton | |
| 2011/0060483 A1 | 3/2011 | Gine I Cortiella et al. | |
| 2011/0181465 A1 | 7/2011 | Li et al. | |
| 2011/0291887 A1 | 12/2011 | Pulford | |
| 2012/0004846 A1 | 1/2012 | Coatantiec et al. | |
| 2016/0084655 A1 * | 3/2016 | Roberfroid | G01S 19/42 701/468 |
| 2018/0120111 A1 * | 5/2018 | Petillon | G05D 1/0825 |

FOREIGN PATENT DOCUMENTS

| | | |
|---|---|---|
| CN | 101034155 A | 9/2007 |
| CN | 103837151 A | 6/2014 |
| EP | 2342609 A1 | 7/2011 |
| FR | 2614694 | 11/1988 |
| FR | 2866423 A1 | 8/2005 |
| FR | 2901363 | 11/2007 |
| FR | 2906893 | 4/2008 |
| FR | 2921729 | 4/2009 |
| FR | 2949866 | 3/2011 |
| FR | 2964199 | 3/2012 |
| FR | 2964468 | 3/2012 |
| FR | 2971857 | 8/2012 |
| FR | 2989174 | 10/2013 |
| FR | 2996647 | 4/2014 |
| JP | H08334338 A | 12/1996 |
| RU | 2013114354 A | 10/2014 |
| WO | 2009141519 A3 | 1/2010 |
| WO | 2010096104 A1 | 8/2010 |

OTHER PUBLICATIONS

Russian Office Action for Application No. RU2017116970/07, dated Apr. 9, 2018, 5 pages.
Written Opinion and International Search Report for PCT/FR2015/000223, Completed by the European Patent Office, dated Apr. 29, 2016, All together 9 Pages.
IEEE Transactions on Aerospace and Electronic Systems Jan. 1995, vol. 31, No. 1, pp. 499-506, "A new failure detection approach and its application to GPS autonomous integrity monitoring".
Chinese Second Office Action & Search Report dated Apr. 1, 2020 (with English Translation), Application No. 201580061339.5, Applicant Airbus Helicopters, 14 Pages.
Eric Foxlin, Research Laboratory of Electronics Massachusetts Institute of Technology, "Intertial Head-Tracker Sensor Fusion by a Complementary Separate-Bias Kalman Filter", 1996 IEEE, pp. 185-195.

* cited by examiner

REDUNDANT DEVICE OF PILOTING SENSORS FOR A ROTARY-WING AIRCRAFT

CROSS REFERENCE TO RELATED APPLICATIONS

This application is the U.S. National Phase of PCT Appln. No. PCT/FR2015/000223 filed Dec. 9, 2015, which claims priority to French patent Appln. No. 14 02824 filed Dec. 11, 2014, the disclosures of which are incorporated in their entirety by reference herein.

BACKGROUND OF THE INVENTION

(1) Field of the Invention

The general field of the present invention is that of providing assistance to piloting aircraft, and to piloting rotary wing aircraft in particular.

The present invention relates to a redundant device of piloting sensors based on at least two satellite navigation systems for an aircraft and serving to determine the speed of the aircraft relative to the ground, and the invention also relates to a method of determining said speed of the aircraft relative to the ground.

Such a satellite navigation system comprises an on-board receiver that receives signals from a plurality of satellites forming part of a constellation of satellites, the constellation being controlled by stationary infrastructure on the ground referred to as the "ground segment". The system constituted by the receiver, by the constellation, and by the ground segment constitutes a satellite navigation system. Such a system is commonly known as a global navigation satellite system (GNSS).

Several GNSSs are presently in operation, such as the US global positioning system (GPS) and the Russian GLONASS system. The Chinese BEIDOU systems, the Japanese QZSS system, and the European GALILEO system are presently under development or being deployed.

A general limit on using GNSS systems in aircraft piloting systems lies in the potential for multiple failures that might affect a plurality of satellites simultaneously, or indeed an entire constellation.

The present invention takes advantage of the availability of a plurality of independent GNSS systems in order to overcome this limitation.

(2) Description of Related Art

Document U.S. Pat. No. 7,436,354 describes a satellite navigation system making simultaneous use of a plurality of GNSS constellations. Such a system operates by processing position measurements coming from distinct GNSS systems, thereby making it possible to detect both single and multiple failures and to exceed the integrity level of receivers based on a single constellation by using receiver autonomous integrity monitoring (RAIM). Such a system nevertheless does not make use of individual RAIM methods on each of the GNSS systems, and it does not enable a level of integrity to be achieved as required for critical applications. Furthermore, that system does not guarantee continuity of navigation information, in particular in the event of loss of signals coming from the satellites, e.g. due to the environment. Finally, such navigation information gives the position of the aircraft, but not its speed.

It is also known that although GNSS systems are designed to enable position to be determined in a variety of vehicles, they can also be used to determine speed. Other technologies also make it possible to estimate the position and the speed of an aircraft, without making use of satellites.

Such systems, in particular inertial reference systems (IRSs), can be combined with using a GNSS receiver in order to limit the effects of the disturbances suffered by GNSS systems. In particular, the ground speed obtained by means of an inertial system can be used to validate the ground speed supplied by a GNSS receiver, providing both ground speeds are similar. Furthermore, and by way of example, in the event of the GNSS systems failing as a result of a satellite failure, or indeed as a result of masking, the inertial system is capable of taking over from the GNSS receiver for a limited duration, and enables the ground speed of the aircraft to be estimated.

By way of example, Document FR 2 906 893 describes a hybrid system having at least two GNSS receivers, at least one inertial measurement unit (IMU) or module enabling information supplied by at least one GNSS receiver and at least one extended Kalman filter to be hybridized. That hybrid system makes it possible to detect a failure in at least one satellite of the GNSS systems. That hybrid system also makes it possible to determine a protection radius that corresponds to error concerning the position supplied by the hybrid system.

The information supplied by such a hybrid system is accurate. In contrast, that hybrid system depends on a single GNSS system, e.g. the GPS system. As a result, the information it supplies does not have sufficient integrity. Furthermore, such a hybrid system needs to include a large number of estimators in order specifically to manage the failure of two satellites. That system is based on making assumptions and testing them. The number of estimators thus corresponds to the number of failure configurations that the system is capable of detecting, on those assumptions. For example, a system designed to detect all combinations of failures on two satellites out of twenty-four satellites in two GNSS constellations must include a number of estimators that is equal to $C_{24}^2=276$. Including a third GNSS constellation raises the number of estimators needed to $C_{36}^2=630$. This increase in the number of estimators then leads to significant costs and to the impossibility of such a system being updated with the arrival of new constellations.

Also known is Document FR 2 964 468, which describes a system for detecting and excluding multiple satellite failures for a multi-GNSS system that makes simultaneous use of a plurality of constellations. That system has a bank of Kalman filters including at least one filter per satellite in use, and it enables information to be excluded that is supplied by a satellite that is considered to have failed. Furthermore, that system may be hybridized with an IMU inertial module. As before, the calculation power required for the bank of Kalman filters increases very quickly with the number of satellites being processed and with the number of satellite failure combinations that are envisaged.

Document US 2011/060483 also describes a system for assisting in the navigation of an aircraft that makes use of three different channels for determining the position of the aircraft. Each channel may make use of a GNSS system or of a GNSS system hybridized with inertial measurements.

Document FR 2 996 647 describes an inertial unit connected to a receiver using measurements coming from a plurality of satellites that are distributed in at least two distinct subsets of satellite in order to determine at least two hybrid navigation solutions. That inertial unit includes a satellite failure detector with a main Kalman filter and a plurality of secondary Kalman filters, and downstream from the Kalman filters it compares the hybrid navigation solutions in order to detect a failure of a satellite and exclude the satellite that has failed.

The use of a main Kalman filter and of secondary Kalman filters, and its application to a navigation system using an inertial unit and a GNSS receiver are described in particular in the document "A new failure detection approach and its application to GPS autonomous integrity monitoring"—IEEE Transactions on Aerospace and Electronic Systems—Vol. 31, No. 1—January 1995—pp. 499-506.

BRIEF SUMMARY OF THE INVENTION

An object of the present invention is to propose a device of piloting sensors for an aircraft that makes it possible to overcome the above-mentioned limitations, the device of piloting sensors being capable of supplying a ground speed of the aircraft that achieves the levels of integrity, availability, and accuracy that are required for a piloting system that makes it possible to fly safely close to the ground and to obstacles. The device of piloting sensors is intended more particularly for a rotary wing aircraft.

In an aspect of the invention, a device of piloting sensors for a rotary wing aircraft includes GNSS constellation receivers for at least two GNSS systems that are independent and distinct, together with at least one fault detection and exclusion (FDE) module for detecting and excluding failures. Each GNSS receiver is connected to at least one antenna and receives initial navigation signals from a plurality of satellites. Each FDE module receives at least two input signals and delivers an output signal, each output signal including a measurement and an integrity state.

In an embodiment, the device of piloting sensors of the invention includes at least two GNSS receivers and can thus make use of at least two distinct GNSS systems. The device of piloting sensors of the invention preferably includes GNSS receivers that are distinct and not similar for the purpose of separately processing the initial navigation signals coming from satellites belonging to each GNSS system. Each GNSS receiver is thus dedicated to one specific GNSS system, such as for example the GPS system, the GLONASS system, the GALILEO system, the QZSS system, and the BEIDOU systems. Specifically, the device of piloting sensors of the invention is redundant both in terms of GNSS systems and in terms of GNSS receivers, and it can thus mitigate failures in one of the GNSS systems or in one of the receivers.

In another embodiment of the invention, each GNSS receiver is a subfunction of a single multi-GNSS receiver, i.e. that is capable of using navigation signals from satellites belonging to different GNSS systems, while supplying distinct solutions for each constellation.

In yet another embodiment, instead of a GNSS system, the device of piloting sensors of the invention may make use of a satellite telecommunications system such as the IRIDIUM system, which makes use of its own constellation of satellites. Since the orbital data of those satellites are known, it is possible to make use of the Doppler effect on the signals they transmit in order to determine the ground speed of a vehicle. Such use of the IRIDIUM system is possible, since the device of piloting sensors of the invention seeks to determine the ground speed of an aircraft rather than its position.

The device of piloting sensors of the invention is remarkable in that each GNSS receiver has a first FDE module and in that the device of piloting sensors includes at least one second FDE module.

Each first FDE module receives and analyzes the initial signals and it detects initial signals that are of integrity and/or initial signals that are erroneous. An implementation of such processing is known under the acronym RAIM, e.g. as described in Document FR 2 971 857.

That RAIM method was initially intended for consolidating position measurements and when it is applied to determining the ground speed of an aircraft it is referred to below in this document as the V-RAIM method.

Each GNSS receiver then delivers a measurement and an integrity state of a first ground speed signal for the aircraft in a geographical reference frame on the basis of initial signals that are of integrity, while excluding any said initial signals that are erroneous.

The availability of a first ground speed signal depends on the number of properly operating satellites of the GNSS system that are visible by the GNSS receivers.

For example, four satellites are generally needed to determine a three-dimensional position and a time offset for the clock of the receiver, or else a three-dimensional speed of an aircraft together with a frequency offset for the clock of the receiver. Nevertheless, at least one fifth satellite is needed in order to have redundancy so as to be able to detect the presence of a single satellite failure. Each first FDE module receives at least four initial signals in order to determine a first ground speed signal and at least five initial signals in order to guarantee that the first ground speed signal is of integrity.

Advantageously, each GNSS receiver may include a high accuracy clock, such as an atomic clock, which it uses as a frequency reference. Each first FDE module then requires at least one initial signal in order to determine a first ground speed signal for the aircraft. As a result, such GNSS receivers including an atomic clock can determine a first ground speed signal, providing three satellites are visible, and it can detect a single satellite failure when four satellites are visible.

Each GNSS receiver can deliver a ground speed measurement that is guaranteed for a first level of integrity by virtue of a first level of autonomous monitoring. This first level of integrity covers only single satellite failures in the constellation of the GNSS receiver.

Each second FDE module is connected to and is in communication with at least two GNSS receivers. Each second FDE module receives, analyzes, and compares the first ground speed signal delivered by at least two GNSS receivers, and then detects first ground speed signals that are of integrity and/or first ground speed signals that are erroneous. Each second FDE module can then detect and exclude each defective GNSS system, if any, by locating a first ground speed signal that is erroneous, and can then determine and deliver a measurement and an integrity state of a second ground speed signal for the aircraft on the basis of at least two first ground speed signals that are of integrity, while excluding the first ground speed signals that are erroneous, if any.

The second FDE module that receives the first ground speed signals can detect multiple failures that affect a plurality of satellites simultaneously, and also failures that affect the ground segment of a GNSS system. By comparing the first ground speed signals issued by at least two GNSS receivers covering at least two distinct and independent GNSS systems, each second FDE module can detect inconsistencies between the first ground speed signals, and can at least passivate the failure.

The term "passivate a failure" is used herein to mean make the failure passive, i.e. without catastrophic or dangerous consequences on the system.

If at least three GNSS systems and three GNSS receivers are initially available, then each second FDE module can detect inconsistencies between the first ground speed signals, can identify the GNSS system that is giving first ground speed signals that are erroneous, and can then exclude that GNSS system. The device of the invention thus makes it possible to locate the defective GNSS system, to exclude it, and to continue operating with the GNSS systems that are valid.

In general manner, an FDE module that receives only two input signals can only detect inconsistencies between those input signals without being able to identify or locate the input signal that is erroneous. Such an FDE module therefore cannot exclude the single component that is supplying such erroneous input signals. The FDE module must therefore exclude both input signals. Consequently, no valid output signal is supplied by the FDE module as soon as it detects inconsistency between its input signals.

In contrast, an FDE module that receives at least three input signals is capable of detecting inconsistencies between those input signals and then of identifying and locating at least one input signal that is erroneous. Such an FDE module can then exclude each component that is supplying an erroneous input signal and can supply an output signal that is valid on the basis of the input signals that are of integrity. An FDE module that receives at least three input signals is capable of detecting and excluding a failed component, while continuing to supply an output signal that is valid.

The second FDE module can operate using the known median method.

Such a method is described for example in Document U.S. Pat. No. 4,264,955. According to that document, the median value of the input signals is calculated. The median value is guaranteed to be of integrity so long as the number of erroneous first ground speed signals is less than half the total number of first ground speed signals that are available as inputs to the second FDE module.

In addition, said median value can be used as a reference for comparing with each of the values of the other input signals. Input signals that depart, in absolute value, from the reference by more than a predetermined threshold are than considered as being defective.

When the second FDE module has only two valid signals at its input, then an excessive difference between these two signals indicates that one of them has failed. Since it cannot locate said failure, the second FDE module passivates the failure by invalidating its output.

Finally, when the second FDE module receives only one first ground speed signal that is valid, no second ground speed signal that is of integrity is supplied, since the integrity of the first ground speed signal cannot be determined.

For example, the predetermined consistency threshold may be equal to 0.2 meters per second (m/s).

The device of piloting sensors of the invention thus makes it possible to determine a ground speed signal for the aircraft that is of sufficient integrity to be used in a piloting system. The integrity of this second ground speed signal for the aircraft results from cascading first and second FDE modules, the second FDE stage detecting failures that are not detected by the first FDE stages on their own.

Furthermore, the second ground speed signal is highly available providing it is determined from more than two distinct and independent GNSS systems. It is very unlikely that multiple failures will affect a plurality of independent GNSS systems simultaneously.

In addition, each GNSS receiver means may advantageously be connected to at least two receive antennas. Thus, each GNSS receiver may act, e.g. as described in Document FR 2 964 199, to determine the arrival directions of initial signals coming from satellites, to compare them with the expected directions, and to discard those of said initial signals for which a mismatch is observed.

In the preferred embodiment of the invention, the availability of a ground speed solution that is of integrity for piloting relationships is improved by making use of inertial measurements. In this embodiment, the device of piloting sensors of the invention further includes at least one IMU inertial module and at least one hybridizing platform. Each IMU inertial module supplies inertial measurement signals characterizing the accelerations and the angular velocities of the aircraft. It is then known to integrate these inertial measurements of accelerations and of angular velocities in order to estimate an inertial ground speed for the aircraft. Each hybridizing platform is connected to and is in communication with both an IMU inertial module and also a second FDE module. The hybridizing platform and the IMU inertial module form an inertial system.

Each hybridizing platform receives and processes these inertial measurement signals possibly also with a second ground speed signal, constituting an assistance speed, and it determines a measurement constituting a third ground speed signal for the aircraft.

In known manner, a speed assisted hybridizing platform performs the following operations:
  integrating inertial measurements in order to obtain a hybrid speed estimate;
  calculating the difference between said hybrid speed estimate and the assistance speed; and
  estimating inertial measurement corrections on the basis of said difference.

During stages of flight in which the assistance speed is not available, the speed that is obtained is purely inertial, however it benefits from the most recent estimated corrections.

The third ground speed signal is thus available continuously, including when the second ground speed signal is not available.

Preferably, the device of piloting sensors of the invention includes at least two hybridizing platforms and at least two IMU inertial modules.

Furthermore, the device of piloting sensors of the invention may include at least one third FDE module. Each third FDE module is connected to and in communication with at least two hybridizing platforms. Each third FDE module receives, analyzes, and compares the third ground speed signals delivered by the hybridizing platforms and detects third ground speed signals that are of integrity and/or third ground speed signals that are erroneous.

Each third FDE module can then detect a failure in an inertial system and can at least passivate that failure. In embodiments where the device of piloting sensors has more than two inertial systems, the third FDE module may also locate the inertial system that is defective and exclude it.

Each third FDE module can thus determine and deliver a measurement and an integrity state of a fourth ground speed signal for the aircraft on the basis of at least two third ground speed signals that are of integrity while excluding the third ground speed signals that are erroneous, if any.

Each third FDE module may use the median method for detecting and possibly locating and excluding third ground speed signals that are defective.

The third FDE module may also be connected to and be in communication with at least one second FDE module in order to receive, analyze, and compare at least one second ground speed signal and the third ground speed signals. Each third FDE module can then detect and locate second and/or third ground speed signals that are of integrity together with second and/or third ground speed signals that are erroneous.

Each third FDE module can determine and deliver a measurement and an integrity state of the fourth ground speed signal for the aircraft on the basis of at least one second ground speed signal that is of integrity and/or at least two third ground speed signals that are of integrity, while excluding the second and/or third ground speed signals that are erroneous, if any.

Each third FDE module can thus locate the detected failure which may either be a failure of an inertial system, or a failure common to the GNSS systems. Each third FDE module can then exclude the defective inertial system or GNSS systems on the basis of the located second and third ground speed signals that are erroneous.

The third FDE module delivers the fourth ground speed signal, e.g. by applying the median value determination method.

Furthermore, the use of at least one inertial system thus makes it possible to ensure continuity for the supply of the third ground speed signal, and consequently of the fourth ground speed signal for the aircraft in the event of there being no available second ground speed signal that is of integrity.

Advantageously, the use of a plurality of inertial systems in the device of piloting sensors makes it possible to passivate faults that are simultaneous and consistent in all of the GNSS systems. Such a situation is practically impossible if the faults under consideration are involuntary faults. However, a malicious attempt by an individual or an organization at falsifying all of the GNSS signals received by an aircraft is not impossible. Thus, under such situations, a system in accordance with the invention rejects all of the second ground speed signals and continues to deliver a fourth ground speed signal that is of integrity and purely inertial.

In a particular embodiment of the invention, each hybridizing platform includes a purely inertial virtual platform and a hybridizing error filter in communication with one another. Each purely inertial virtual platform is connected to and in communication with an IMU inertial module, thus forming an inertial unit.

The device of piloting sensors then has two inertial units, a computer with two calculation channels, and two hybridizing error filters per inertial unit, one in each calculation channel. Each calculation channel calculates two hybridizing error filters, firstly with a second FDE module and secondly with a third FDE module. Each second FDE module is connected to and in communication with two hybridizing error filters, and each third FDE module is in communication with two hybridizing error filters for each calculation channel. Using these two calculation channels in parallel makes it possible to detect and passivate a malfunction, if any, in one of the calculation channels.

Each purely inertial virtual platform receives inertial measurement signals from an IMU inertial module that the purely inertial virtual platform transforms into a pure inertial ground velocity. Each inertial unit delivers a pure inertial ground speed for the aircraft. Each hybridizing error filter is then connected to an inertial unit and to a second FDE module in order to receive a pure inertial ground speed for the aircraft and a second ground speed signal for the aircraft.

In addition, each hybridizing error filter is preferably a Kalman filter that estimates the errors affecting the state variables rather than the state variables directly.

The present invention also provides a method of determining a ground speed for an aircraft, the method comprising a plurality of steps.

During a first step, receiving initial navigation signals coming from a plurality of systems belonging to at least two independent GNSS systems.

During a second step, analyzing the initial navigation signals for each GNSS system.

During a third step, detecting initial navigation signals that are of integrity and/or initial signals that are erroneous.

During a fourth step, delivering a measurement and an integrity state of at least two first ground speed signals for the aircraft in a geographic reference frame for at least two distinct and independent GNSS systems from the initial signals that are of integrity, while excluding the initial signals that are erroneous, if any.

During a fifth step, analyzing and comparing the first ground speed signals.

During a sixth step, detecting first ground speed signals that are of integrity and/or first ground speed signals that are erroneous.

During a seventh step, detecting and excluding each defective GNSS system supplying a first ground speed signal that is erroneous.

During an eighth step, determining and delivering a measurement and an integrity state of at least one second ground speed signal for the aircraft from at least two first ground speed signals that are of integrity, while excluding said first ground speed signals that are erroneous, if any.

During the eighth step, it is possible to determine at least one second ground speed signal for the aircraft if at least two first ground speed signals are available. Each second ground speed signal for the aircraft is determined by a median method.

The method of determining a ground speed for an aircraft thus makes it possible to detect a single satellite failure in a GNSS system and/or multiple failures within one or more GNSS systems. The second ground speed signal for the aircraft thus remains available and of integrity in spite of multiple failures.

In a first variant of this implementation of the invention, the method may include additional steps.

During a ninth step, acquiring inertial measurement signals, the inertial measurement signals characterizing the accelerations and the angular velocities of the aircraft.

During a tenth step, processing each second ground speed signal and the inertial measurement signals.

During an eleventh step, determining and delivering at least one measurement constituting at least one third ground speed signal for the aircraft on the basis of the inertial measurement signals and of a second ground speed signal that is of integrity, if any, the third ground speed signal then being available continuously.

During this eleventh step, each third ground speed signal may be determined using a known hybridizing method as used conventionally in the field of aviation. Such a hybridizing method makes it possible to deliver a hybridized third ground speed signal.

During a twelfth step, analyzing and comparing the third ground speed signals.

Thereafter, during a thirteenth step, detecting third ground speed signals that are of integrity and/or third ground speed signals that are erroneous.

During a fourteenth step, determining and delivering a measurement and an integrity state of a fourth ground speed signal for the aircraft on the basis of at least two third ground speed signals that are of integrity, while excluding said third ground speed signals that are erroneous, if any. This fourteenth ground speed signal may be determined by the median method.

In a second variant of this implementation of the invention, these additional steps take place as follows, with the ninth, tenth, and eleventh steps being identical to those in the first variant.

During the twelfth step, analyzing and comparing at least a second ground speed signal and the third ground speed signals.

During the thirteenth step, detecting and locating second ground speed signals that are of integrity and/or third ground speed signals that are of integrity together with second ground speed signals that are erroneous and/or third ground speed signals that are erroneous.

During the fourteenth step, determining and delivering a measurement and an integrity state of a fourth ground speed signal of the aircraft on the basis of at least one second ground speed signal that is of integrity and/or at least two third ground speed signals that are of integrity, while excluding the second and/or third ground speed signals that are erroneous, if any.

The steps may run on from one another sequentially. Nevertheless, it is possible for the ninth step to run simultaneously with at least one of the first eight steps.

BRIEF DESCRIPTION OF THE DRAWINGS

The invention and its advantages appear in greater detail from the context of the following description of embodiments given by way of illustration and with reference to the accompanying figures, in which.

DETAILED DESCRIPTION OF THE INVENTION

Elements present in more than one of the figures are given the same references in each of them.

Figure 1:
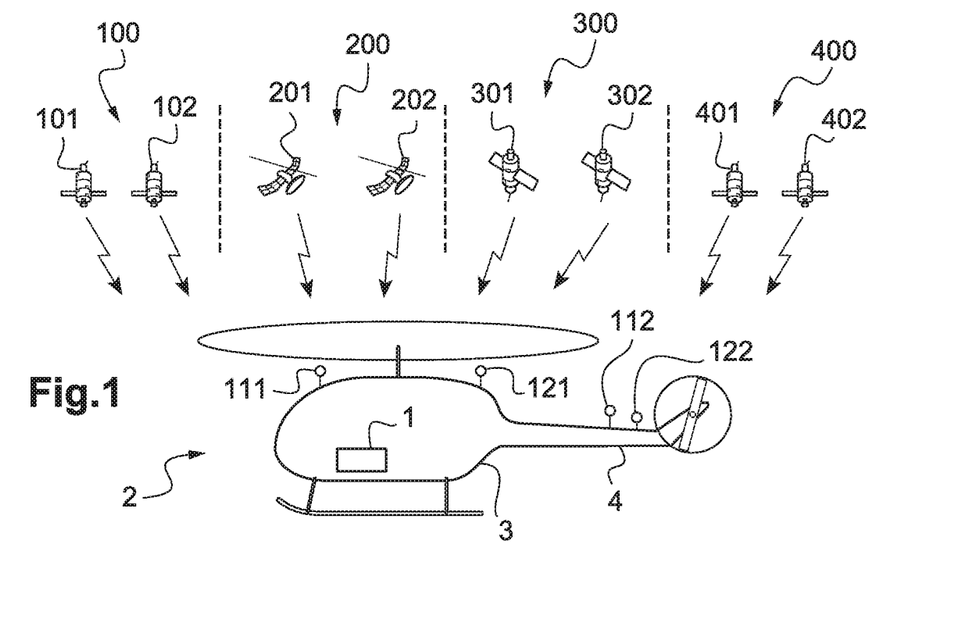
FIG. 1 shows a rotary wing aircraft fitted with a device of piloting sensors of the invention.

FIG. 1 shows a rotary wing aircraft 2 having a device of piloting sensors 1 of the invention. This device of piloting sensors 1 has four antennas 111, 112, 121, and 122. Two of the antennas 111 and 121 are positioned on top of the fuselage 3 of the aircraft 2, and two of the antennas 112 and 122 are positioned on the tail boom 4 of the aircraft 2. These antennas 111, 112, 121, and 122 serve to pick up initial navigation signals transmitted by various satellites 101, 102, 201, 202, 301, 302, 401, and 402.

The satellites 101, 102, 201, 202, 301, 302, 401, and 402 belong to respective GNSS systems 100, 200, 300, and 400 such as the GPS system, the GLONASS system, the GALILEO system, the QZSS system, and the BEIDOU systems.

Figure 2:
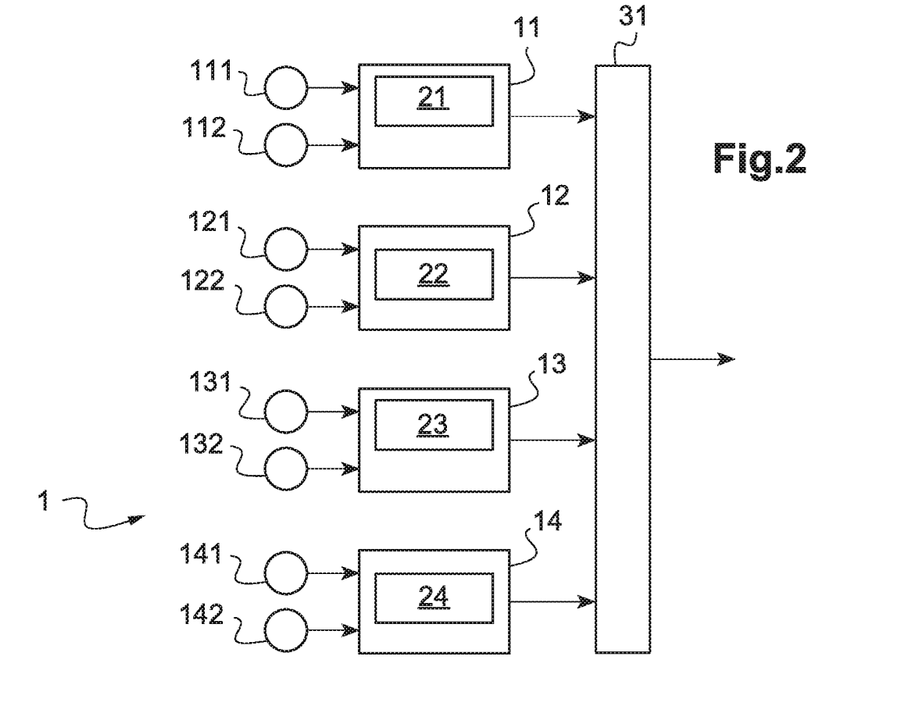
FIGS. 2 to 4 show various embodiments of a device of piloting sensors of the invention.

In a first embodiment of the device of piloting sensors 1 as shown in FIG. 2, the device of piloting sensors 1 has four GNSS receivers 11, 12, 13, and 14 dedicated to respective ones of the GNSS systems 100, 200, 300, and 400, and a second fault detection and exclusion (FDE) module 31 for detecting and excluding failures connected to each GNSS receiver 11, 12, 13, and 14. The device of piloting sensors 1 is thus redundant in terms of GNSS systems 100, 200, 300, and 400, and it is capable of covering four GNSS systems 100, 200, 300, and 400 and thus mitigating any failure in at least one of these GNSS systems 100, 200, 300, and 400. Each GNSS receiver 11, 12, 13, and 14 is connected to two antennas 111 & 112, 121 & 122, 131 & 132, and 141 & 142 and it has a single first FDE module 21, 22, 23, or 24.

Each first FDE module 21, 22, 23, or 24 receives and analyzes the initial navigation signals from respective GNSS receiver 11, 12, 13, 14 in order to detect initial navigation signals that are of integrity and initial navigation signals that are erroneous.

Thereafter, each first FDE module 21, 22, 23, 24 can use these initial signals that are of integrity to determine a first ground speed signal for the aircraft 2. By way of example, this first ground speed signal of the aircraft 2 may be determined by a V-RAIM method of receiver autonomous integrity monitoring.

Specifically, each GNSS receiver 11, 12, 13, and 14 can deliver a first ground speed signal for the aircraft 2 while guaranteeing a first level of autonomous monitoring and integrity for this first ground speed signal in the event of a single satellite failure in a GNSS system 100, 200, 300, or 400.

The second FDE module 31 receives and compares the first ground speed signal coming from the four GNSS receivers 11, 12, 13, and 14. The second FDE module 31 can then detect multiple failures of at least one GNSS system 100, 200, 300, 400, and can exclude each GNSS system 100, 200, 300, 400 that is suffering from such a multiple failure and can determine a second ground speed signal for the aircraft 2.

The second FDE module 31 may apply the known median method for determining the second ground speed signal from two first ground speed signals.

Figure 3:
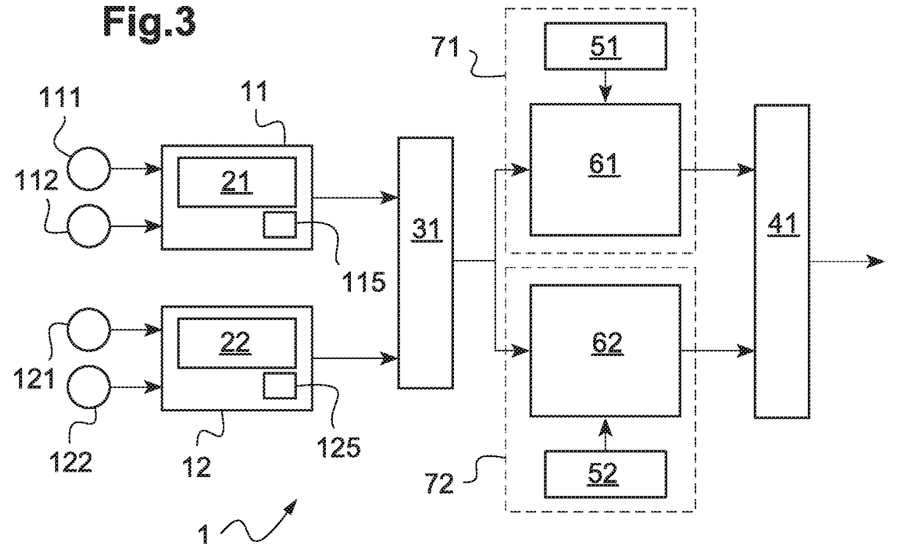

In a second embodiment of the device of piloting sensors 1, as shown in FIG. 3, the device of piloting sensors 1 has two GNSS receivers 11, 12, each GNSS receiver 11, 12, being connected to two antennas 111 & 112 and 121 & 122, a second FDE module 31, two IMU inertial modules 51, 52, two hybridizing platforms 61, 62, and a third FDE module 41.

Furthermore, each GNSS receiver 11, 12 has a first FDE module 21, 22 together with an atomic clock 115, 125. The atomic clock 115, 125 is used as a frequency reference making it possible to reduce by one the number of satellites needed by each GNSS receiver 11, 12 in order to determine firstly a single satellite failure, and secondly a first ground speed signal.

The second FDE module 31 is connected to both of the GNSS receivers 11, 12 and to both of the hybridizing platforms 61, 62, and it delivers a second ground speed signal for the aircraft 2.

Each IMU inertial module 51, 52 supplies inertial measurement signals concerning accelerations and angular speeds, and it is connected to a hybridizing platform 61, 62. An IMU inertial module 51, 52 and the hybridizing platform 61, 62 to which it is connected thus together form an inertial system 71, 72. Each hybridizing platform 61, 62 receives the inertial measurements of accelerations and of angular velocities, and can thus determine a pure inertial ground signal for the aircraft 2.

Each hybridizing platform 61, 62 also receives the second ground speed signal for the aircraft 2 and can thus process this second ground speed signal and the pure inertial ground speed for the aircraft 2 in order to determine a third ground speed signal for the aircraft 2.

This third ground speed signal is a ground speed hybridized from the second ground speed signal and from the pure initial ground speed, when the second ground speed signal is of integrity. This third ground speed signal is equal to the pure inertial ground speed when the second ground speed signal is erroneous or unavailable. The third ground speed signal is thus available continuously.

The third FDE 41 module is connected to both of the hybridizing platforms 61, 62. This third FDE module 41 thus receives, analyzes, and compares the two third ground speed signals for the aircraft 2 in order to determine a fourth ground speed signal for the aircraft 2, e.g. using the median method.

The third FDE module 41 can thus detect inconsistencies between these third ground speed signals for the aircraft 2, e.g. resulting from a failure of a hybridizing platform 61, 62, or indeed of an IMU inertial module 51, 52.

In this second embodiment, the integrity and the availability of the fourth ground speed signal for the aircraft 2 is improved by using two IMU inertial modules 51, 52, and two GNSS receivers 11, 12 for two GNSS systems 100, 200 that are independent and distinct.

Figure 4:
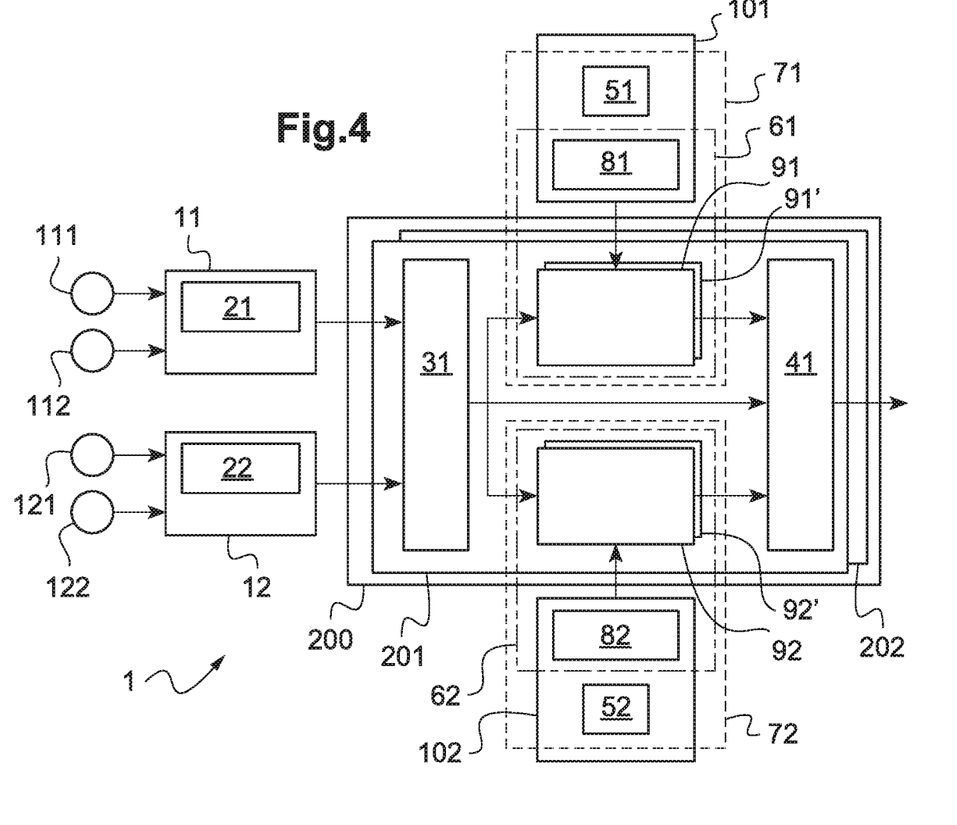

In a third embodiment of the device of piloting sensors 1, as shown in FIG. 4, the device of piloting sensors 1, as in the second embodiment, comprises two GNSS receivers 11, 12, a second FDE module 31, two IMU inertial modules 51, 52, two hybridizing platforms 61, 62, and a third FDE module 41. Each GNSS receiver 11, 12 is dedicated to a single GNSS system 100, 200, thus making it possible to cover two GNSS systems 100, 200, e.g. the GPS system and the GALILEO system.

The device of piloting sensors 1 also includes a computer 200 having two calculation channels 201 and 202. Each hybridizing platform 61, 62 comprises a purely inertial virtual platform 81, 82 and two hybridizing error filters 91 & 91' and 92 & 92', with one hybridizing error filter 91, 91', 92, 92' being situated in each calculation channel 201, 202.

In each calculation channel 201, 202, the second FDE module 31 is connected to both of the GNSS receivers 11, 12 and to two of the hybridizing error filters 91 & 91' or 92 & 92', and also to the third FDE module 41. The second FDE module 31 thus delivers a second ground speed signal that is of integrity for the aircraft 2.

A purely inertial virtual platform 81, 82 is connected to an IMU inertial module 51, 52 and thus co-operates with the IMU inertial module 51, 52 to form an inertial unit 101, 102 supplying a pure inertial ground speed for the aircraft 2.

Each hybridization error filter 91, 91', 92, 92' is preferably a Kalman filter.

Each hybridization error filter 91, 91', 92, 92' receives, analyzes, and compares the second ground speed signal for the aircraft 2 with the pure inertial ground speed for the aircraft 2, and then determines the third ground speed signal for the aircraft 2, which may be a hybridized ground speed or else a pure inertial ground speed. This third ground speed signal is thus available continuously.

The third FDE module 41 is connected to the hybridizing error filters 91, 91', 92, 92' and also to the second FDE module 31. This third FDE module 41 then receives, analyzes, and compares two third ground speed signals and the second ground speed signal, and then determines a fourth ground speed signal for the aircraft 2 using both of the calculation channels 201 and 202. The third FDE module 41 may use the median method, for example.

In addition, the third FDE module 41 can detect inconsistencies between the two third ground speed signals and the second ground speed signal for the aircraft 2 and can identify which ground speed signal is erroneous. The third FDE module 41 then makes it possible, where necessary, to exclude the erroneous ground speed signal.

As a result, the device of piloting sensors 1 makes it possible to ensure that a fourth ground speed signal is supplied continuously.

The operation of this third embodiment is analogous to the operation of the second embodiment. The use of two GNSS receivers 11, 12 and of two inertial units 101, 102 makes it possible to guarantee the availability and the integrity of the fourth ground speed signal for the aircraft 2, including in the event of there being no available second ground speed signal that is of integrity. Advantageously, the comparison between the second and third ground speed signals in the third FDE module 41 makes it possible to detect anomalies in a plurality of GNSS systems 100, 200 that might otherwise pass unnoticed in the second embodiment of the device of piloting sensors 1, e.g. due to scrambling or decoys. The integrity of this fourth ground speed signal is thus increased and it is then sufficient for a piloting system of the aircraft 2.

Finally, this device of piloting sensors 1 makes use of components that are standard, such as, in particular, two GNSS receivers 11, 12, and two inertial units 101, 102, for example, thereby reducing its costs.

Figure 5:
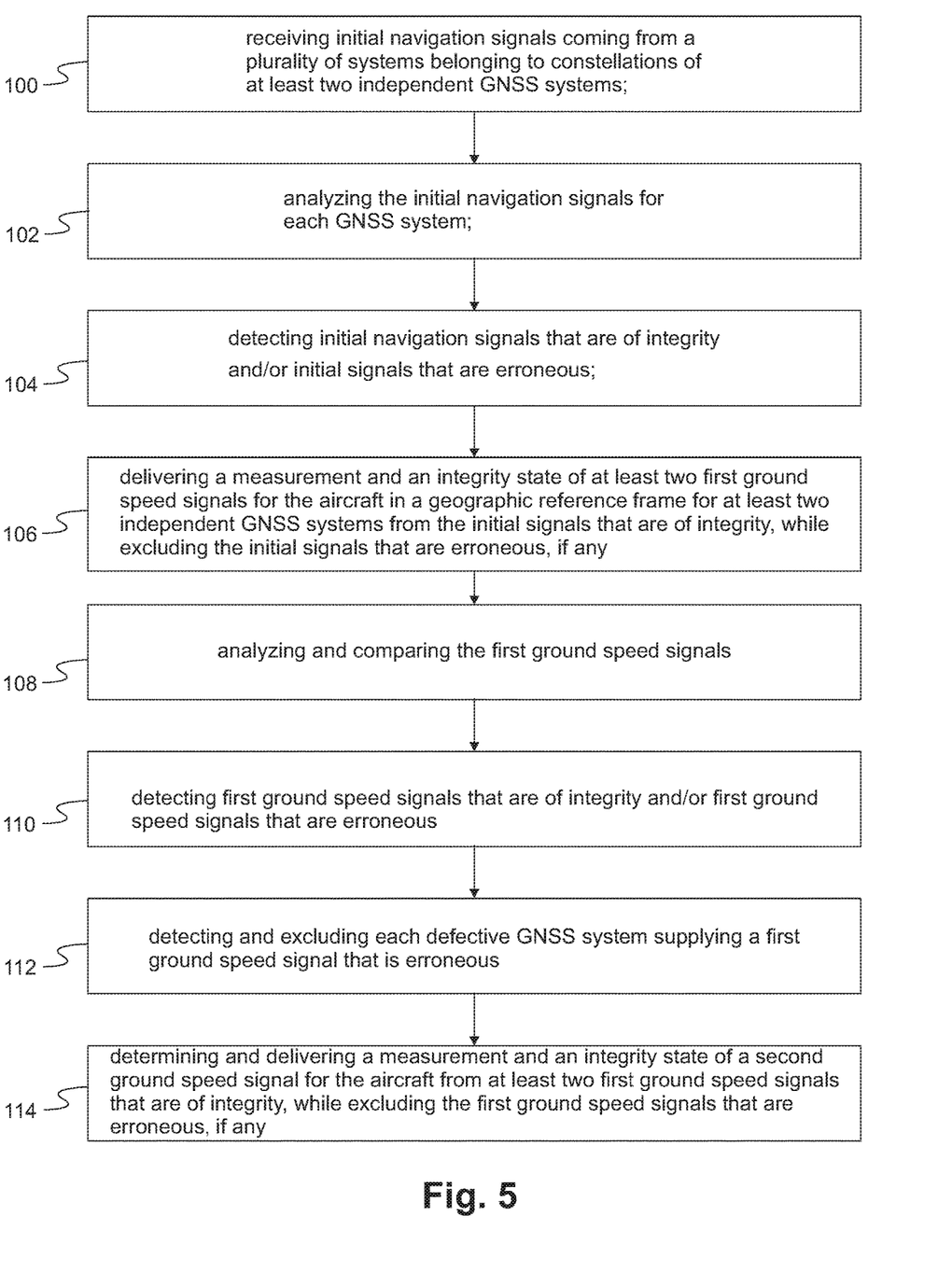
FIG. 5 shows a flowchart for a method of determining a ground speed of an aircraft.

FIG. 5 provides a flowchart for a method of determining a ground speed of an aircraft. The method includes a first step (Box 100) of receiving initial navigation signals coming from a plurality of systems belonging to constellations of at least two independent GNSS systems. The method also includes a second step (Box 102) of analyzing the initial navigation signals for each GNSS system. The method also includes a third step (Box 104) of detecting initial navigation signals that are of integrity and/or initial signals that are erroneous. The method also includes a fourth step (Box 106) of delivering a measurement and an integrity state of at least two first ground speed signals for the aircraft in a geographic reference frame for at least two independent GNSS systems from the initial signals that are of integrity, while excluding the initial signals that are erroneous, if any. The method also includes a fifth step (Box 108) of analyzing and comparing the first ground speed signals. The method also includes a sixth step (Box 110) of detecting first ground speed signals that are of integrity and/or first ground speed signals that are erroneous. The method also includes a seventh step (Box 112) of detecting and excluding each defective GNSS system supplying a first ground speed signal that is erroneous. The method also includes an eighth step (Box 114) of determining and delivering a measurement and an integrity state of a second ground speed signal for the aircraft from at least two first ground speed signals that are of integrity, while excluding the first ground speed signals that are erroneous, if any.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A device of piloting sensors for a rotary wing aircraft, the device comprising:
   GNSS receivers for receiving constellations of at least two independent GNSS systems, the GNSS receivers receiving initial signals from a plurality of satellites; and
   at least one FDE module for detecting and excluding failures;
   wherein:
      each FDE module receives at least two input signals and delivers an output signal, each output signal including a measurement and an integrity state of the at least two input signals;
      each GNSS receiver includes a respective first FDE module;
      each first FDE module receives and analyzes the initial signals, and it detects initial signals that are of integrity and/or initial signals that are erroneous;
      each GNSS receiver delivers a measurement and an integrity state concerning a first ground speed signal for the aircraft in a geographic frame of reference for at least one GNSS system on the basis of the initial signals that are of integrity and excluding the initial signals that are erroneous, if any; and
      the device of piloting sensors includes at least one second FDE module, each second FDE module being in communication with at least two of the GNSS receivers and receiving, analyzing, and comparing the first ground speed signal delivered by the at least two independent GNSS receivers, detecting first ground speed signals that are of integrity and/or first ground speed signals that are erroneous, each second FDE module then being capable of detecting and excluding each defective GNSS system that is supplying a first ground speed signal that is erroneous, and then of determining and delivering, where appropriate, a measurement and an integrity state of a second ground speed signal for the aircraft on the basis of at least two first ground speed signals that are of integrity.

2. The device of piloting sensors according to claim 1, wherein the device of piloting sensors includes at least three independent GNSS systems, and each second FDE module is in communication with at least three of the GNSS receivers and receives, analyzes, and compares the first ground speed signals delivered by the at least independent three GNSS receivers, detects first ground speed signals that are of integrity and/or first ground speed signals that are erroneous, each second FDE module then being capable of detecting and excluding each defective GNSS system that is supplying a first ground speed signal that is erroneous, and then for determining and delivering a measurement and an integrity state of a second ground speed signal for the aircraft on the basis of at least two first ground speed signals that are of integrity, while excluding the first ground speed signals that are erroneous, if any.

3. The device of piloting sensors according to claim 1, wherein the device of piloting sensors includes at least one IMU inertial module and at least one hybridizing platform,
   each IMU inertial module supplying inertial measurement signals characterizing accelerations and angular velocities of the aircraft;
   each hybridizing platform being in communication with a second FDE module and with an IMU inertial module; and
   each hybridizing platform receives and processes the inertial measurement signals and possibly the second ground speed signal, and then determines and delivers a measurement constituting a third ground speed signal for the aircraft on the basis of the inertial measurement signal and of the second ground speed signal that is of integrity, if any, the third ground speed signal being a pure inertial ground speed when the hybridizing platform does not receive any second ground speed signal that is of integrity, and being a hybridized ground speed when the hybridizing platform receives the second ground speed signal that is of integrity, the third ground speed signal then being available continuously.

4. The device of piloting sensors according to claim 3, wherein the device of piloting sensors includes at least two hybridizing platforms, at least two IMU inertial modules, and at least one third FDE module, a hybridizing platform and an IMU inertial module forming an inertial system, each third FDE module being in communication with at least two hybridizing platforms in order to determine and deliver a fourth ground speed signal, each third FDE module receiving, analyzing, and comparing the third ground speed signals delivered by the hybridizing platforms and detecting third ground speed signals that are of integrity and/or third ground speed signals that are erroneous, each third FDE module then being capable of detecting a failure in an inertial system and of excluding the inertial system on the basis of the third ground speed signals that are erroneous, if any, and then of determining and delivering, where appropriate, a measurement and an integrity state of the fourth ground speed signal for the aircraft on the basis of at least two third ground speed signals that are of integrity.

5. The device of piloting sensors according to claim 4, wherein the device of piloting sensors includes at least three hybridizing platforms, at least three IMU inertial modules, each third FDE module being in communication with at least three hybridizing platforms in order to determine and deliver a fourth ground speed signal, each third FDE module receiving, analyzing, and comparing the third ground speed signals delivered by the hybridizing platforms and detecting third ground speed signals that are of integrity and/or third ground speed signals that are erroneous, each third FDE module then being capable of detecting a failure in an inertial system and possibly of excluding the inertial system on the basis of the third ground speed signals that are erroneous, and then of determining and delivering a measurement and an integrity state of the fourth ground speed signal for the aircraft from at least two third ground speed signals that are of integrity, while excluding the third ground speed signals that are erroneous, if any.

6. The device of piloting sensors according to claim 4, wherein each third FDE module is in communication with at least one second FDE module so as to be capable of receiving, analyzing, and comparing at least one second ground speed signal and the third ground speed signals, of detecting and locating second and/or third ground speed signals that are of integrity and also second and/or third ground speed signals that are erroneous, and then of determining and delivering a measurement and an integrity state of the fourth ground speed signal for the aircraft on the basis of at least one second ground speed signal that is of integrity and/or at least two third ground speed signals that are of integrity, while excluding the second and/or third ground speed signals that are erroneous, if any.

7. The device of piloting sensors according to claim 4, wherein:
   each hybridizing platform includes a purely inertial virtual platform and two hybridizing error filters communicating with one another, the purely inertial virtual platform being in communication with an IMU inertial module, thereby forming an inertial unit, wherein a purely inertial virtual platform receives only inertial measurement signals from an IMU inertial module and then supplies a pure inertial ground velocity; and the device of piloting sensors includes two inertial units, a computer having two calculation channels and four hybridizing error filters, each calculation channel putting a hybridizing error filter into communication firstly with a second FDE module and secondly with a third FDE module;

each second FDE module being in communication with two hybridizing error filters for each calculation channel; and each third FDE module being in communication with two hybridizing filters for each calculation channel.

8. The device of piloting sensors according to claim 4, wherein at least one second FDE module and/or at least one third FDE module use(s) a median value determination method.

9. The device of piloting sensors according to claim 1, wherein at least one GNSS receiver includes an atomic clock.

10. The device of piloting sensors according to claim 1, wherein the GNSS receivers are in communication with GNSS systems selected from the group consisting of the GPS system; the GLONASS system; the GALILEO system; the QZSS system; the BEIDOU systems; and the IRIDIUM system.

11. The device of piloting sensors according to claim 1, wherein the device of piloting sensors includes at least two hybridizing platforms, at least two IMU inertial modules, and at least one third FDE module, each third FDE module being in communication with at least two hybridizing platforms in order to determine and deliver a fourth ground speed signal, each third FDE module receiving, analyzing, and comparing the third ground speed signals delivered by the hybridizing platforms and detecting third ground speed signals that are of integrity and/or third ground speed signals that are erroneous, each third FDE module then being capable of detecting a failure in a hybridizing platform and of excluding the hybridizing platform on the basis of the third ground speed signals that are erroneous, if any, and then of determining and delivering, where appropriate, a measurement and an integrity state of the fourth ground speed signal for the aircraft on the basis of at least two third ground speed signals that are of integrity.

12. The device of piloting sensors according to claim 11, wherein each third FDE module is in communication with at least one second FDE module so as to be capable of receiving, analyzing, and comparing at least one second ground speed signal and the third ground speed signals, of detecting and locating second and/or third ground speed signals that are of integrity and also second and/or third ground speed signals that are erroneous, and then of determining and delivering a measurement and an integrity state of the fourth ground speed signal for the aircraft on the basis of at least one second ground speed signal that is of integrity and/or at least two third ground speed signals that are of integrity, while excluding the second and/or third ground speed signals that are erroneous, if any.

13. The device of piloting sensors according to claim 11, wherein:

each hybridizing platform includes a purely inertial virtual platform and two hybridizing error filters communicating with one another, the purely inertial virtual platform being in communication with an IMU inertial module, thereby forming an inertial wherein a purely inertial virtual platform receives only inertial measurement signals from an IMU inertial module and then supplies a pure inertial ground velocity; and the device of piloting sensors includes two inertial units, a computer having two calculation channels and four hybridizing error filters, each calculation channel putting a hybridizing error filter into communication firstly with a second FDE module and secondly with a third FDE module;

each second FDE module being in communication with two hybridizing error filters for each calculation channel; and each third FDE module being in communication with two hybridizing filters for each calculation channel.

14. The device of piloting sensors according to claim 11, wherein at least one second FDE module and/or at least one third FDE module use(s) a median value determination method.

15. The device of piloting sensors according to claim 1, wherein each first FDE module determines the integrity state of the initial signals and whether or not the initial signals are erroneous by a RAIM method and wherein each second FDE module determines the integrity state of the first ground speed signals and whether or not the first ground speed signals are erroneous by a median method.

16. A method of determining a ground speed of an aircraft, the method comprising the following steps:

a first step of receiving by GNSS receivers initial navigation signals coming from a plurality of systems belonging to constellations of at least two independent GNSS systems;

a second step of analyzing by at least on FDE module the initial navigation signals for each GNSS system;

a third step of detecting by the at least on FDE module initial navigation signals that are of integrity and/or initial signals that are erroneous;

a fourth step of delivering a measurement and an integrity state by the GNSS receivers of at least two first ground speed signals for the aircraft in a geographic reference frame for at least two independent GNSS systems from the initial signals that are of integrity, while excluding the initial signals that are erroneous, if any;

a fifth step of analyzing and comparing the first ground speed signals by at least on FDE module;

a sixth step of detecting by the at least on FDE module a first ground speed signals that are of integrity and/or first ground speed signals that are erroneous;

a seventh step of detecting and excluding by the at least on FDE module each defective GNSS system supplying a first ground speed signal that is erroneous; and an eighth step of determining and delivering by the GNSS receivers a measurement and an integrity state of a second ground speed signal for the aircraft from at least two first ground speed signals that are of integrity, while excluding the first ground speed signals that are erroneous, if any.

17. The method of determining a ground speed for an aircraft according to claim 16, the method comprising the following steps:

a ninth step of acquiring inertial measurement signals, the inertial measurement signals characterizing the accelerations and the angular velocities of the aircraft;

a tenth step of processing each second ground speed signal and the inertial measurement signals;

an eleventh step of determining and delivering at least one measurement constituting at least one third ground speed signal for the aircraft on the basis of the inertial measurement signals and of a second ground speed signal that is of integrity, if any, the third ground speed signal then being available continuously;

a twelfth step of analyzing and comparing the third ground speed signals;

a thirteenth step of detecting third ground speed signals that are of integrity and/or third ground speed signals that are erroneous; and a fourteenth step of determining and delivering a measurement and an integrity state of a fourth ground speed signal for the aircraft on the basis of at least two third ground speed signals that are of integrity, while excluding the third ground speed signals that are erroneous, if any.

18. The method of determining a ground speed of an aircraft according to claim 16, the method comprising the following steps:

a ninth step of acquiring inertial measurement signals, the inertial measurement signals characterizing the accelerations and the angular velocities of the aircraft;

a tenth step of processing each second ground speed signal and the inertial measurement signals;

an eleventh step of determining and delivering at least one measurement constituting at least one third ground speed signal for the aircraft on the basis of the inertial measurement signals and of a second ground speed signal that is of integrity, if any, the third ground speed signal then being available continuously;

a twelfth step of analyzing and comparing at least a second ground speed signal and the third ground speed signals;

a thirteenth step of detecting and locating second ground speed signals that are of integrity and/or third ground speed signals that are of integrity together with second ground speed signals that are erroneous and/or third ground speed signals that are erroneous; and a fourteenth step of determining and delivering a measurement and an integrity state of a fourth ground speed signal of the aircraft on the basis of at least one second ground speed signal that is of integrity and/or at least two third ground speed signals that are of integrity, while excluding the second and/or third ground speed signals that are erroneous, if any.

19. A device of piloting sensors for a rotary wing aircraft, the device comprising:

at least two GNSS receivers for receiving constellations of at least two independent GNSS systems, the GNSS receivers receiving initial signals from a plurality of satellites and delivering a measurement and an integrity state concerning a first ground speed signal for the aircraft in a geographic frame of reference for at least one GNSS system on the basis of the initial signals that are of integrity and excluding the initial signals that are erroneous, if any;

at least one FDE module for detecting and excluding failures, each FDE module receives at least two input signals and delivers an output signal, each output signal including a measurement and an integrity state;

at least one second FDE module, each second FDE module being in communication with the at least two GNSS receivers and receiving, analyzing, and comparing the first ground speed signal delivered by the at least two GNSS receivers, detecting first ground speed signals that are of integrity and/or first ground speed signals that are erroneous, each second FDE module then being capable of detecting and excluding each defective GNSS system that is supplying a first ground speed signal that is erroneous, and then of determining and delivering, where appropriate, a measurement and an integrity state of a second ground speed signal for the aircraft on the basis of at least two first ground speed signals that are of integrity;

at least one IMU inertial module and at least one hybridizing platform, each IMU inertial module supplying inertial measurement signals characterizing accelerations and angular velocities of the aircraft;

each hybridizing platform being in communication with a second FDE module and with at least one IMU inertial module; and each hybridizing platform receives and processes the inertial measurement signals and possibly the second ground speed signal, and then determines and delivers a measurement constituting a third ground speed signal for the aircraft on the basis of the inertial measurement signal and of the second ground speed signal that is of integrity, if any.

20. The device of piloting sensors according to claim 19, wherein at least one GNSS receiver includes an atomic clock.

21. The device of piloting sensors according to claim 19, wherein the GNSS receivers are in communication with GNSS systems selected from the group consisting of the GPS system; the GLONASS system; the GALILEO system; the QZSS system; the BEIDOU systems; and the IRIDIUM system.

* * * * *